United States Patent
Wang et al.

(10) Patent No.: US 6,868,095 B2
(45) Date of Patent: Mar. 15, 2005

(54) CONTROL CHANNEL IMPLEMENTATION IN A PACKET SWITCHED COMMUNICATIONS NETWORK

(75) Inventors: Linghsiao Wang, Tustin, CA (US); Craig Barrack, Irvine, CA (US); Rong-Feng Chang, Irvine, CA (US)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 797 days.

(21) Appl. No.: 09/756,570

(22) Filed: Jan. 8, 2001

(65) Prior Publication Data

US 2002/0089978 A1 Jul. 11, 2002

(51) Int. Cl.[7] .................................................. H04J 3/12
(52) U.S. Cl. ........................ 370/527; 370/528; 370/529
(58) Field of Search ................................ 370/522, 523, 370/527, 528, 529

(56) References Cited

U.S. PATENT DOCUMENTS

| | | | | |
|---|---|---|---|---|
| 5,227,907 A | * | 7/1993 | Rao et al. .................... | 398/100 |
| 5,559,796 A | | 9/1996 | Edem et al. | |
| 5,650,825 A | * | 7/1997 | Naimpally et al. ......... | 348/465 |
| 5,751,723 A | * | 5/1998 | Vanden Heuvel et al. .. | 370/528 |
| 5,898,678 A | * | 4/1999 | Jin et al. ..................... | 370/315 |
| 5,909,564 A | | 6/1999 | Alexander et al. | |
| 6,330,245 B1 | * | 12/2001 | Brewer et al. ............... | 370/424 |
| 6,510,162 B1 | * | 1/2003 | Fijolek et al. ............... | 370/432 |
| 6,597,695 B1 | * | 7/2003 | Desai et al. ............. | 370/395.1 |
| 6,636,499 B1 | * | 10/2003 | Dowling ...................... | 370/338 |
| 6,667,985 B1 | * | 12/2003 | Drummond-Murray ..... | 370/415 |
| 6,674,769 B1 | * | 1/2004 | Viswanath ................... | 370/469 |
| 2002/0027888 A1 | * | 3/2002 | Creigh ......................... | 370/282 |
| 2002/0075809 A1 | * | 6/2002 | Phaal ........................... | 370/245 |

FOREIGN PATENT DOCUMENTS

| | | |
|---|---|---|
| EP | 1 006 751 A3 | 6/2002 |
| GB | 2 338 155 | 12/1999 |

OTHER PUBLICATIONS

Dr. Howard Johnson; "Update to Protocol Proposal Sep. 09, 1996"; IEEE 802.3 HSSG Gigabit Ethernet; 19 Pages.

* cited by examiner

Primary Examiner—Chau Nguyen
Assistant Examiner—Christine Ng
(74) Attorney, Agent, or Firm—Tucker Ellis & West LLP

(57) ABSTRACT

A system and method for implementing a control channel in a packet switched communications network. In a computer network, such as a local area network (LAN) it is known to utilize the Ethernet for distributing communications between stations. The Ethernet employs a standard frame format that includes header frames and, in particular a preamble frame which may be used to provide synchronization information between switching devices or nodes. The preamble frame is not required in a Gigabit Ethernet implementation and the present invention employs a portion of the preamble frame to implement a control channel between switching devices.

10 Claims, 2 Drawing Sheets

| Byte | Data | |
|---|---|---|
| 0 | 10101010 | |
| 1 | 10101010 | |
| 2 | 01010101 | ◄— Special format |
| 3 | 0▇▇▇▇▇▇▇ | ⎫ |
| 4 | 0▇▇▇▇▇▇▇ | ⎬ ◄— Embedded information |
| 5 | 0▇▇▇▇▇▇▇ | ⎭ |
| 6 | 10101010 | |
| 7 | 10101011 | ◄— SFD |

| Byte | Data |
|---|---|
| 0 | 10101010 |
| 1 | 10101010 |
| 2 | 10101010 |
| 3 | 10101010 |
| 4 | 10101010 |
| 5 | 10101010 |
| 6 | 10101010 |
| 7 | 10101011 ← SFD |

FIGURE 3

| Byte | Data |  |
|---|---|---|
| 0 | 10101010 | |
| 1 | 10101010 | |
| 2 | 01010101 | ← Special format |
| 3 | 0▮▮▮▮▮▮▮ | ⎫ |
| 4 | 0▮▮▮▮▮▮▮ | ⎬ Embedded information |
| 5 | 0▮▮▮▮▮▮▮ | ⎭ |
| 6 | 10101010 | |
| 7 | 10101011 | ← SFD |

FIGURE 4

CONTROL CHANNEL IMPLEMENTATION IN A PACKET SWITCHED COMMUNICATIONS NETWORK

FIELD OF THE INVENTION

This invention relates to packet switched communications networks and more particularly to a system and method for implementing a control channel between switching nodes in such networks.

BACKGROUND

Packet switched communications networks having multiple switching nodes connected by the Ethernet are used extensively in computer based communications systems. The Ethernet is used in local area networks (LAN), for example, to interconnect or link a plurality of clients to a client server. Ethernet implementations typically transfer data packets or frames between switching nodes over a physical medium such as a twisted copper pair, coaxial cable, fiber optic cable, etc. Early Ethernet systems operated at data rates of 10-Mb/s and typically employed coaxial cables. Second generation Ethernet systems operate at 100 Mb/s and the more recent Ethernet systems known as Gigabit Ethernet operate at data rates of 1 Gigabit per second and will typically employ fiber optic cables.

The Ethernet has been standardized by the LAN Standards Committee of the IEEE under the Ethernet standard IEEE 802.3. According to this standard the Ethernet frame has a packet format which includes a preamble, source and destination address, length of data field and the data field itself. In Ethernet the data field is a variable length which can be up to 1500 bytes or octets.

The preamble frame which is an 8 octet frame is used for synchronization in the 10 Mb/s and 100 Mb/s systems. In the Gigabit Ethernet system, however, the synchronization function is not necessary because the link is always active and the synchronization is always maintained. The present invention makes use of this preamble frame by selecting portions of the unused octet for implementing a control channel between switching nodes.

SUMMARY OF THE INVENTION

This invention provides an implementation of a cost-free control channel between Ethernet switches by exploiting the Ethernet frame preamble. In a network of switches, it is often desirable to transfer information between devices, for example, port based flow control or priority information.

Therefore, in accordance with a first aspect of the present invention there is provided a method of implementing a control channel for exchanging information between switching devices in a packet switched communications network, comprising: selecting an unused portion of a packet format used for communicating between switching devices; and embedding control information in the unused portion.

In accordance with a second aspect of the present invention there is provided a system for implementing a control channel for use in exchanging information between switching devices in a packet switched communications network, comprising: means to select an unused portion of a packet format used to carry communication between switching devices; and means to embed control information in the unused portion.

BRIEF DESCRIPTION OF THE DRAWINGS

The invention will now be described in greater detail with reference to the attached drawings wherein:

FIG. 3 illustrates a standard 64 bit preamble frame for an Ethernet frame; and

FIG. 4 illustrates one possible preamble format for a Gigabit Ethernet frame with extra information embedded.

DETAILED DESCRIPTION OF THE INVENTION

Figures 1, 2:
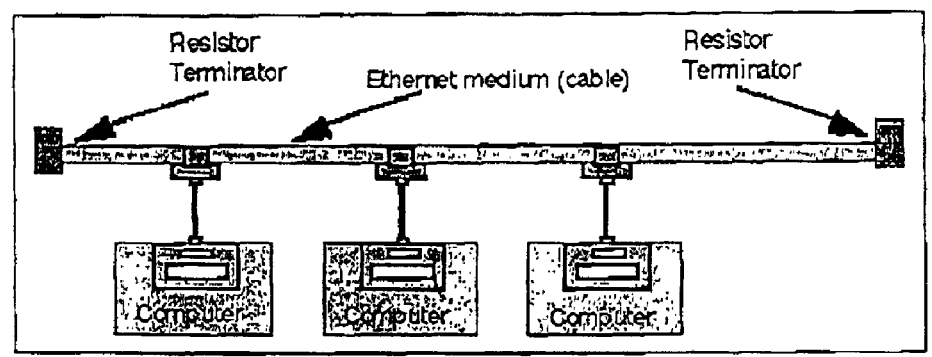
FIG. 1 is a block diagram of a Ethernet system.
FIG. 2 illustrates the Ethernet frame format.

FIG. 1 is a simplified version of a Ethernet system employing multiple computers connected to the Ethernet medium which may be a twisted copper pair, a coaxial cable or in a Gigabit Ethernet application an optical fiber. For reasons to be discussed in greater detail there are numerous occasions when it is desirable to transfer control information between respective computers. As stated previously, in a Gigabit Ethernet implementation the preamble frame which is typically used for synchronization purposes, is not required and it is the preamble frame which is used in the present invention to convey control information between computers or switching nodes.

FIG. 2 illustrates a typical Ethernet frame format which has an eight octet preamble frame; a six octet destination address, a six octet source address; a two octet length of data field and a data field itself which may be of varying length from 0 to 1500 bytes.

The originality of the present invention arises from the simplicity, efficiency and frugality with which the control channel is implemented. By simply exploiting the aforementioned Ethernet frame format the control channel is obtained without any resource cost. No data bandwidth is sacrificed and no functionality of the Ethernet is compromised.

As stated above the first eight bytes of an Ethernet frame comprises the preamble. FIG. 3 illustrates the makeup of the eight octet frame from byte zero to byte seven. As illustrated in FIG. 3 the first seven bytes of the preamble are all 10101010. The last byte of the preamble is called the start of frame delimiter (SFD) and is indicated by 10101011. As discussed above the packet header follows the preamble which includes information such as source and destination MAC addresses.

The preamble is typically intended as a synchronization pattern. It allows the receiving station to synchronize on the transmitted signals frequency. The first bytes of the preamble may be lost as a result of the phase lock latency so nothing important may be contained therein. In reality, however, this synchronization function is not necessary for a Gigabit Ethernet because in Gigabit Ethernet the link is always active and synchronization is always maintained. In other respects, however, Gigabit Ethernet is just a fast version of Ethernet. In particular, the standard Ethernet frame format is the same. For Gigabit Ethernet, the preamble of an Ethernet frame is essentially wasted bandwidth. It should be noted, however, that while the preamble frame is not required for synchronization, the entire frame is not available for holding control information. For example, a delimiter will typically be required to separate one packet from another.

According to the present invention this otherwise wasted bandwidth is reclaimed by using it to pass control information between devices connected by a Gigabit Ethernet link. FIG. 4 shows one example of how this objective may be achieved.

Note that in FIG. 4 the preamble has a special format by placing a special code 01010101 in byte 2. The next three bytes contain the embedded information. Also note that the high order bit of bytes 3 through 5 is set to 0 to contrast it with the standard octets 6 and 7. As note previously, a delimiter byte is required and in the implementation of FIG. 4 the first three bytes are not used for control information. While, in theory, it may be acceptable to keep only the first byte as a delimiter to indicate that a new packet is coming and byte 7 as a frame delimiter, in reality, there may be errors in one or more both of these fields. To guard against this rather small probability, in this implementation bytes 1 and 2 as well as byte 6 are not used for holding control information.

Other preamble formats are possible as long as they exploit the octets that lead to wasted bandwidth in a Gigabit Ethernet. Applicants herein are not aware of any previous design which has carried packet by packet information in a control channel implemented by exploiting the Gigabit Ethernet frame preamble.

There are numerous applications where a channel for information exchange between switching devices is highly valuable.

Many of these applications fall under the category of clustering, in which two or more switches are managed as a single unit, and are expected to perform as a single unit. For clustering to work, additional information about each packet may need to be transported among devices so that the system can behave as a unified whole. Examples of additional information which may be transported follow.

1. Flow control disable/enable: Suppose that when a packet arrives at its destination device within a switch cluster, its output port is congested. In order to ensure quality of service for the system, one possibility is to queue the packet, but send a flow control message back to the packet's original source port. On the other hand, if flow control is disabled on the packet's source port, the packet may simply be discarded. Whether a packet's original access port is enabled or disabled for flow control is one example of control information that needs to be exchanged among switches.

2. Port-based priority: In a port-based priority scheme, all packets originating from the same source port are assigned the same transmission priority. In a switch cluster, if a packet's source port and destination port are located on different devices, then the priority of a packet is lost once it crosses between devices. Under these circumstances, the only way for the transmission scheduler at the output to know the priority of the packet is via between-device communication.

3. Port trunking: In a switching system, a trunk is a group of physical ports that behaves as a single, logical port. If a packet is destined to a trunk, then a hashing algorithm is used to decide to which physical port in the trunk the packet will be forwarded. In a switch cluster, the physical ports that comprise a trunk may be located on multiple devices. Therefore, to implement port trunking in a cluster, the hash result may need to be communicated among devices.

4. Port mirroring: The port mirroring feature in a switching system allows the received or transmitted data of any port to be copied to any other port in the system. As with port trunking, in a switch cluster, the ports that comprise a mirrored pair may be located on two different devices, again necessitating a control channel for information exchange.

5. Multicast distribution in a ring: Suppose that a cluster of switches is organized in a ring configuration, and that a multicast packet is forwarded around the ring to multiple destinations. One way for a device to know that the multicast packet has traversed the entire ring, and should now be discarded, is to compare its own ID with the packet's source device ID. If the two identifiers are equal, then the packet has made its way around the entire ring, and can be discarded. Without such a protocol, the multicast packet might loop forever around the ring. A multicast packet's source device ID is another example of control information that may need to be exchanged among switches.

This invention is not limited to Gigabit Ethernet. The same approach applies to any present or future incarnation of the Ethernet in which the frame preamble is not required for synchronization. While particular embodiments of the invention have been described and illustrated it will be apparent to one skilled in the art that numerous changes can be made without departing from the basic concept of the invention. It is to be understood that such changes will fall within the first scope of the invention as defined by the appended claims.

What is claimed is:

1. A method of implementing a control channel for exchanging information between switching devices in a packet switched Gigabit Ethernet network, comprising:

selecting an unused portion of an 8 octet preamble frame of a packet format used for communicating between switching devices, wherein a third octet of said preamble frame containing a special code to signify that following frames contain control information; and embedding the control information in the unused portion.

2. The method as defined in claim 1, wherein said control information is embedded in three octets following said third octet.

3. The method as defined in claim 2, wherein said three octets having embedded control information have a distinctive high order bit.

4. The method as defined in claim 1 wherein said switching devices are managed as a group of switches in a clustered arrangement.

5. The method as defined in claim 4 wherein said control information relates to disable and enable flow control.

6. The method as defined in claim 4 wherein said control information relates to transmission of priority packets between switching devices.

7. The method as defined in claim 4 wherein said control information relates to results of a hash algorithm implemented as between ports within said cluster.

8. The method as defined in claim 4 wherein said control information relates to ports making up a mirrored pair involving a switch cluster.

9. The method as defined in claim 4 wherein said control information relates to multicast packet protocols distributed to cluster switches within said network.

10. A system for implementing a control channel for use in exchanging information between switching devices in a packet switched Gigabit Ethernet network comprising:

means to select an unused portion of a packet format used to carry communication between switching devices, the unused portion being an 8 octet preamble frame, a octet of the preamble contains a special code to signify that following frames contain control information; and means to embed control information in the unused portion.

* * * * *